(12) United States Patent
Miskin

(10) Patent No.: US 7,165,346 B2
(45) Date of Patent: Jan. 23, 2007

(54) METHOD AND DEVICE FOR AIR-ASSISTED MOVING OF SOIL IN AN EARTH MOVING APPARATUS

(76) Inventor: Mark R. Miskin, 225 Targhee Towne Rd., Alta, WY (US) 83414

( * ) Notice: Subject to any disclaimer, the term of this patent is extended or adjusted under 35 U.S.C. 154(b) by 0 days.

(21) Appl. No.: 10/987,633

(22) Filed: Nov. 11, 2004

(65) Prior Publication Data

US 2005/0072028 A1 Apr. 7, 2005

Related U.S. Application Data

(62) Division of application No. 10/427,471, filed on Apr. 30, 2003, now Pat. No. 6,845,824.

(51) Int. Cl.
*E02F 3/65* (2006.01)
(52) U.S. Cl. ....................................................... 37/419
(58) Field of Classification Search ............. 172/684.5, 172/669; 37/443, 444, 411, 412, 416, 419, 37/425, 431, 438, 905, 315, 323, 344
See application file for complete search history.

(56) References Cited

U.S. PATENT DOCUMENTS

| | | | |
|---|---|---|---|
| 2,514,782 A | 7/1950 | Miskin | |
| 2,990,019 A | 6/1961 | Finn | |
| 3,702,509 A | 11/1972 | Zowaski | |
| 4,150,503 A | 4/1979 | Lespinasse | |
| 4,383,380 A | 5/1983 | Miskin | |
| 4,397,106 A * | 8/1983 | MdDowell | 37/329 |
| 4,398,363 A | 8/1983 | Miskin | |
| 4,398,769 A | 8/1983 | Jacoby | |
| 4,573,743 A | 3/1986 | Grathoff | |
| 4,943,165 A | 7/1990 | Boggs | |
| 4,946,227 A | 8/1990 | Paul | |
| 4,993,498 A | 2/1991 | Fresnel | |
| 5,487,229 A | 1/1996 | Nathenson et al. | |
| 5,860,232 A | 1/1999 | Nathenson et al. | |
| 6,178,670 B1 | 1/2001 | Susman et al. | |
| 6,202,330 B1 * | 3/2001 | Bolton | 37/403 |
| 6,347,670 B1 | 2/2002 | Miskin | |
| 6,432,303 B1 * | 8/2002 | Chesner et al. | 210/170 |
| 6,446,365 B1 * | 9/2002 | Sullivan et al. | 37/195 |
| 6,449,883 B1 | 9/2002 | Vandycke | |
| 6,751,893 B2 * | 6/2004 | Sullivan et al. | 37/195 |
| 6,845,824 B2 * | 1/2005 | Miskin | 172/684.5 |
| 6,857,207 B1 * | 2/2005 | Adler | 37/195 |

* cited by examiner

*Primary Examiner*—Victor Batson
(74) *Attorney, Agent, or Firm*—Morriss O'Bryant Compagni, P.C.

(57) ABSTRACT

Devices and methods for air-assisted loading of soil in an earth-moving apparatus are disclosed. One aspect of a device includes a source of a current of air and at least one conduit for directing the current of air towards soil moved by the earth-moving apparatus. The device is configured to be operatively connected to the earth-moving apparatus. An earth-moving apparatus is also disclosed. The apparatus includes a frame having opposing sides, supported by at least two ground-engaging wheels, and a bucket having a floor and a pair of upstanding sidewalls. A cutting blade may be attached to the bucket or disposed between the opposing sides of the frame. An air supply system for delivering a current of air to soil moved by the earth-moving apparatus is also included. Methods for loading soil into an earth-moving apparatus are also disclosed.

6 Claims, 9 Drawing Sheets

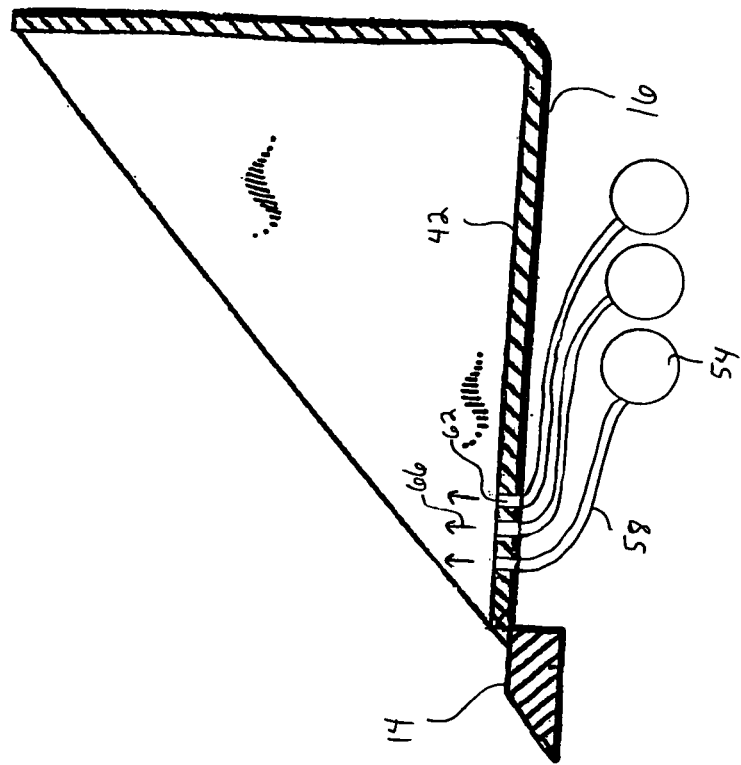
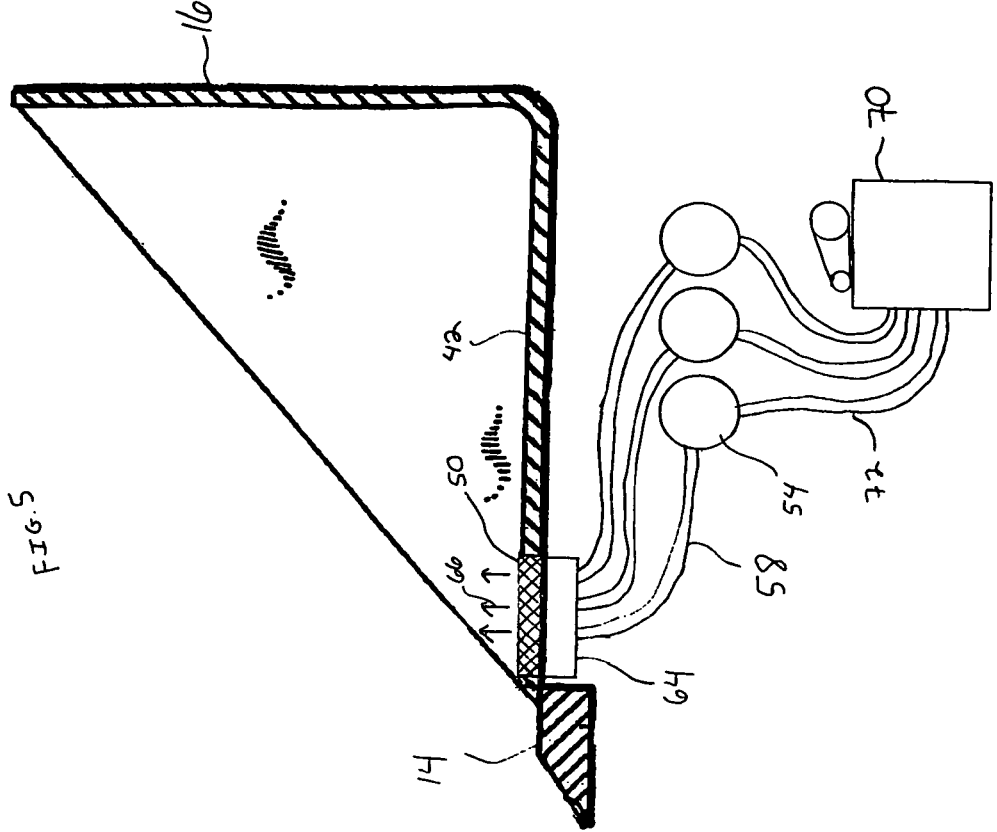

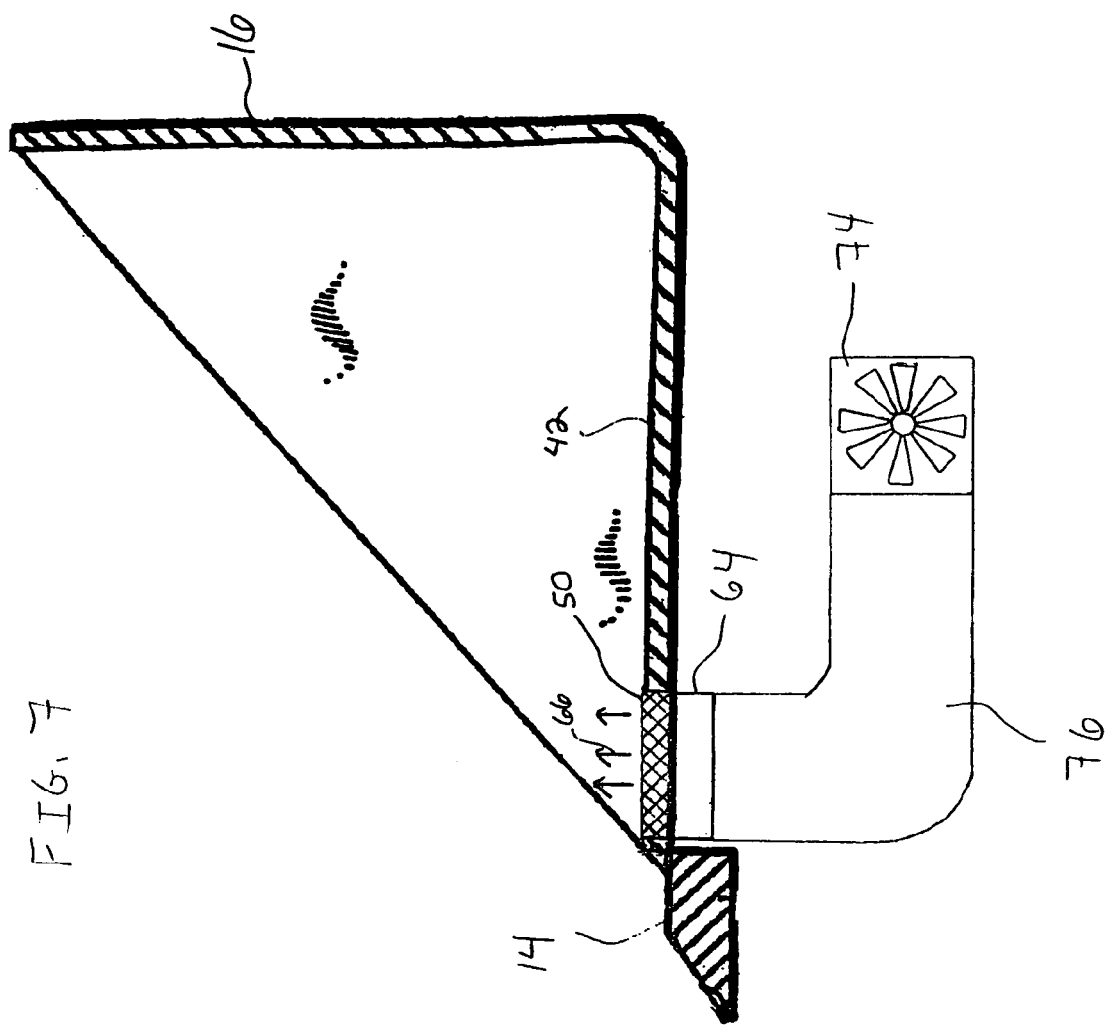

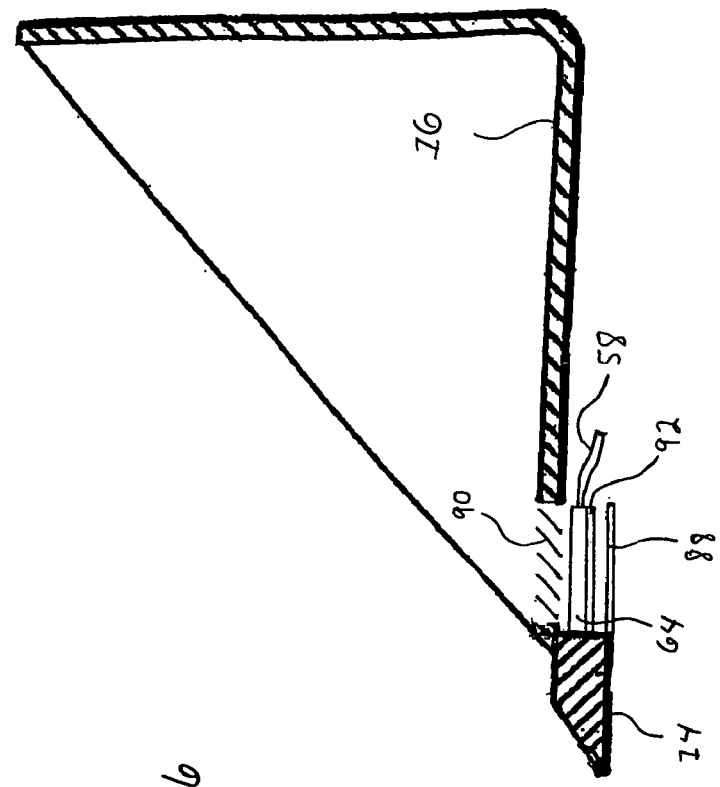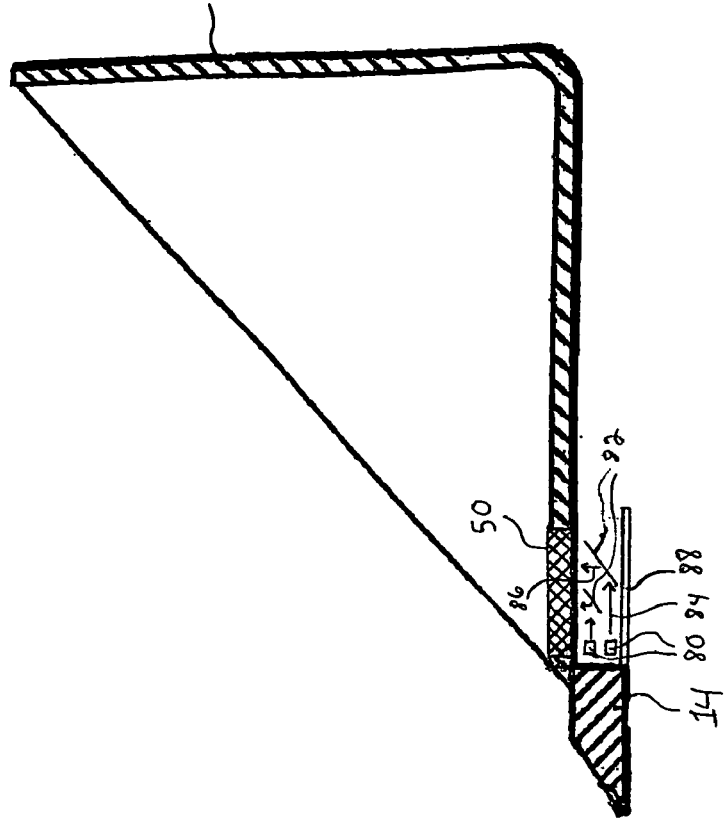

METHOD AND DEVICE FOR AIR-ASSISTED MOVING OF SOIL IN AN EARTH MOVING APPARATUS

CROSS-REFERENCE TO RELATED APPLICATION

This application is a division of application Ser. No. 10/427,471, filed Apr. 30, 2003 now U.S. Pat. 6,845,824.

TECHNICAL FIELD

The present invention relates generally to an apparatus for modifying the earth's surface by removing soil from the earth's surface at one location and moving the soil to a new location. More specifically, the present invention relates to earth-moving apparatus including a bucket that receives soil removed from the earth and a system to assist loading the soil therein.

BACKGROUND

Scrapers and other earth-moving apparatus of the general type to which the present invention relates are known. Representative examples of earth-moving scrapers include, without limitation, the scrapers disclosed in U.S. Pat. Nos. 4,383,380, 4,388,769, 4,398,363, 4,553,608 and 6,347,670 to Miskin, each of which is incorporated herein by reference in its entirety. A typical scraper includes a frame having a front end, two opposing sides and at least two wheels connected to the opposing sides. A bucket for holding soil removed from the earth is connected to the frame. The bucket includes a floor, two opposing sidewalls, an open front and an open top. A blade is located adjacent the front edge of the floor of the bucket for cutting the earth to a predetermined depth as the earth-moving apparatus is moved forward over the earth's surface. The soil cut from the earth by the blade is collected in the bucket. When the bucket is full of soil, the scraper is transported to another location where the soil is deposited.

The soil is removed from the bucket of the scrapers in different ways. For instance, moving back scrapers, sweep scrapers, open bottom dump scrapers and dump scrapers are known. For instance, an ejector scraper has a moving wall or ejector assembly which pushes the soil out of the bucket. An example of an ejector scraper is disclosed in U.S. Pat. No. 6,041,528 assigned to Harvey Mfg. Corp., which is incorporated by reference in its entirety herein. An example of a sweep scraper is an elevating-type scraper that discharges soil collected in the bucket by moving members, or slats, across of the floor of the bucket. An exemplary sweep scraper is disclosed in U.S. Pat. No. 3,934,360, assigned to Westinghouse Air Brake Company, which is incorporated by reference in its entirety herein. In an open bottom dump scraper, the bucket of the scraper is tilted to dump the soil out of an open end of the bucket. Examples of pull-type, bottom dump scrapers include construction scrapers disclosed in U.S. Pat. Nos. 4,383,380, 4,388,769, 4,398,363, 4,553,608 and 6,347,670 to Miskin, discussed previously herein.

A pull-type scraper or earth-moving apparatus may have an elongated tongue attached to a frame. The tongue may be connected to a tractor that tows the scraper or the earth-moving apparatus. The tongue may be connected to a tractor with a hitch or may include a so-called rigid gooseneck that pivots and is attached to the tractor. Alternatively, the scraper may include a front set of "dolly" wheels or may be attached to a separate dolly that attaches to a tractor. Other scrapers or other earth-moving apparatuses are self-propelled.

When the scraper or earth-moving apparatus is moved forward over the surface of the earth and the blade is lowered, the blade cuts the soil and delivers the soil to the bucket. The soil travels over the upper surface of the blade and into the bucket. However, for various reasons, the soil may be hindered from collecting in the bucket during delivery of the soil to the bucket and prevent freshly cut soil from being stored in the bucket. For instance, when the scraper or earth-moving apparatus is operated under dry conditions or in powdery soils, as the bucket fills, the collected soil may accumulate as a clump of loose material. The clump of loose material may be difficult to displace with additional loose soil, preventing freshly cut soil from entering the bucket. Another problem may arise when the soil is unloaded from the bucket since the soil may stick to the bucket or clump together to obstruct the collected soil from exiting the bucket.

Thus, a need exists for a device or an improved earth-moving apparatus that allows the soil to enter or exit the scraper or earth-moving apparatus while reducing clogging during a scraping or unloading process.

SUMMARY OF THE INVENTION

The present invention includes devices for air-assisted loading of soil in an earth-moving or ground-leveling apparatus. The devices include a source of a current of air and at least one conduit for directing air at the soil moved by the earth-moving or ground-leveling apparatus. The devices are configured to be operatively connected to the earth-moving or ground-leveling apparatus.

The present invention also includes an earth-moving or ground-leveling apparatus including a frame having opposing sides. The frame is supported by at least two ground-engaging wheels. A cutting blade may be disposed generally laterally between the opposing sides of the frame. The earth-moving or ground-leveling apparatus also includes a bucket having a floor, a wall and a pair of upstanding sidewalls. The bucket is positioned such that an edge of the floor is adjacent to a trailing edge of the cutting blade. In some embodiments, the cutting blade may be attached directly to the edge of the bucket, rather than the frame. The earth-moving or ground-leveling apparatus also includes an airflow system for delivering a current of air to soil moved by the earth-moving or ground-leveling apparatus.

The present invention is also directed to methods for loading soil in an earth-moving or ground-leveling apparatus. The methods include providing an earth-moving apparatus which includes a cutting blade, a bucket and an airflow system. The methods further include cutting soil with the earth-moving apparatus and directing a current of air to contact the soil cut with the earth-moving apparatus.

BRIEF DESCRIPTION OF THE DRAWINGS

It will be appreciated by those of ordinary skill in the art that the elements depicted in the various drawings are not drawn to scale but are for illustrative purposes only. The nature of the present invention, as well as other embodiments of the present invention, may be more clearly understood by reference to the following detailed description of the invention, to the appended claims and to the several drawings herein, wherein:

FIG. 5 is a side view of a bucket and air supply system of the earth-moving apparatus of FIG. 1;

FIG. 6 is a side view of a bucket and air supply system of the earth-moving apparatus of FIG. 4;

FIG. 7 is a side view of a bucket and air supply system of another embodiment of an earth-moving apparatus of the present invention;

FIG. 9 is a side view of a bucket and air supply system of a further embodiment of an earth-moving apparatus of the present invention;

FIG. 10 is a side view of a bucket and air supply system of yet another embodiment of an earth-moving apparatus of the present invention.

DETAILED DESCRIPTION

The present invention relates generally to an apparatus for modifying the earth's surface by removing soil from the earth's surface at one location and moving the soil to a new location. More specifically, the apparatus relates to earth-moving scrapers that include a frame carried by at least two wheels, a cutting blade connected to the frame and a bucket mounted to the frame and located adjacent to the blade such that the bucket receives the soil cut by the blade. In the following detailed description, an airflow system is operatively connected to the earth-moving scraper to direct a current of air at the soil moved by the earth-moving scraper.

It will be apparent by those of ordinary skill in the art that the embodiments described herein, while illustrative, are not intended to so limit the invention or the scope of the appended claims. Those of ordinary skill will understand that various combinations or modifications of the embodiments presented herein may be made without departing from the scope of the present invention. For instance, the earth-moving or ground-leveling apparatus, device for air-assisted loading of earth in an earth-moving or ground-leveling apparatus and methods described herein, while suited for directing air at the soil moved by the earth-moving scraper described herein, may be adapted for directing a current of air at soil moved by any earth-moving apparatus.

Figure 1:
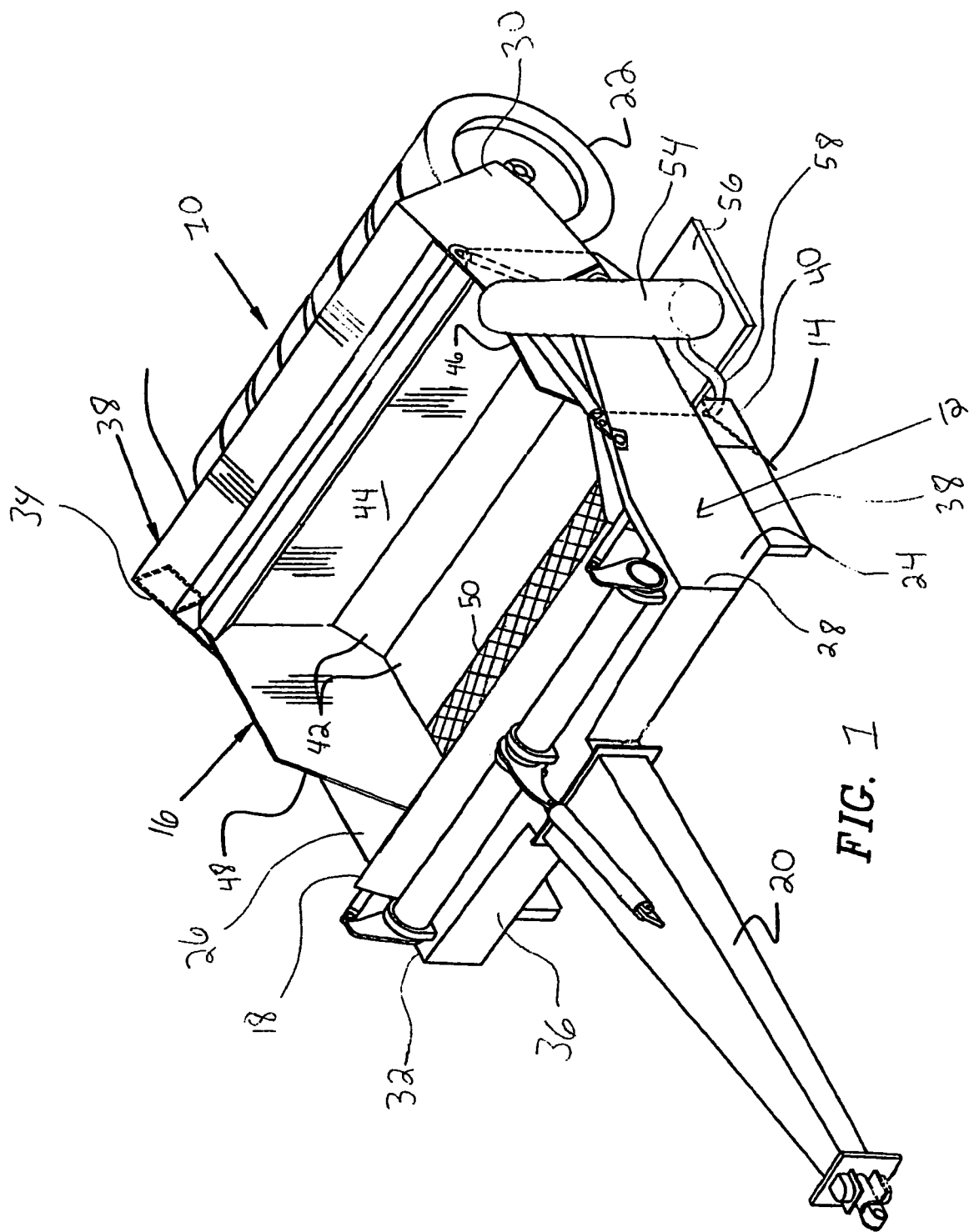
FIG. 1 is a perspective view of an earth-moving apparatus of the present invention.

Referring now to drawing FIG. 1, there is shown, generally at 10, a perspective view of an earth-moving apparatus which includes a device for air-assisted loading of soil of the present invention. Representative examples of earth-moving apparatus which may be used in conjunction with the device for air-assisted loading of soil of the present invention include, without limitation, the scrapers disclosed in U.S. Pat. Nos. 4,383,380, 4,388,769, 4,398,363, 4,553,608 and 6,347,670 to Miskin. It will be apparent that the device for air-assisted loading of soil of the present invention may be configured to be operatively connected to any pull-type scraper, self-propelled scraper, moving back scraper that includes a moving wall or ejector assembly in the bucket that pushes the soil out of the bucket, sweep scraper that includes at least one moving section of the floor of the bucket that transfers the soil out of the bucket, open bottom scraper or dump scraper that includes a bucket configured to tilt and dump the soil out of the bucket in addition to the scrapers disclosed in the Miskin patents.

As illustrated in drawing FIG. 1, the earth-moving apparatus 10 includes a frame 12, a cutting blade 14, a bucket 16, an apron 18, a tongue 20 and at least two ground-engaging wheels 22. The frame 12 includes first and second opposing side members 24 and 26, respectively. The first side member 24 has a first end 28 and a second end 30 and the second side member 26 has a first end 32 and a second end 34. The first end 28 of first side member 24 and the first end 32 of second side member 26 are joined to one another by a front member 36. The second ends 30 and 34 of first and second side members 24 and 26, respectively, are attached to a carrier shown, generally, at 38.

The cutting blade 14 is attached to the frame 12 and is disposed generally laterally between the opposing first and second side members 24 and 26, respectively, of the frame 12. In the illustrated embodiment, the cutting blade 14 is adjoined to a bottom 37 of first side member 24 and a bottom (not shown) of second side member 26. The cutting blade 14 is attached to a portion 40 of the frame 12 that extends downwardly from the first side member 24 and a portion (not shown) of the frame 12 that extends downwardly from the second side member 26. In other embodiments, the cutting blade 14 may be attached to the bucket 16 and it will be apparent that the cutting blade 14 may be adjoined to the earth-moving apparatus 10 in any manner known by those of ordinary skill in the art.

In the illustrated embodiment, the bucket 16 includes a floor 42, an upstanding back wall 44 and upstanding sidewalls 46 and 48. To allow a current of air produced by the device for air-assisted loading of the present invention to pass through the floor 42, a portion of the floor 42 of the bucket 16 may comprise a screen 50. The screen 50 may comprise a single screen or a plurality of sections of screens. The screen 50 allows the current of air to flow upwardly away from the floor 42 of the bucket 16 and to contact soil moved by the earth-moving apparatus 10.

Referring again to FIG. 1, the device for air-assisted loading includes an air supply system 54 that produces a current of air. The air supply system 54 of the present invention is meant to include any system that generates a current or stream of air, such as a source of pressurized air or a device that moves air. The current of air produced by the air supply system 54 of the present invention has a sufficient velocity and volume to substantially prevent dirt from falling into the current of air or into the air supply system 54 producing the current of air. The current of air is transferred to the screen 50 through a conduit 58, such as an air line. In the illustrated embodiment, the air supply system 54 comprises an air tank filled with compressed air. An air supply tank may be attached to the earth-moving apparatus 10 by a shelf 56, as shown, or any known device may be employed to support the air supply system 54. For example, an air tank may be mounted on a pulling tractor rather than directly to the earth-moving apparatus 10; such a tractor-mounted air tank can serve as a counterweight to a pulled scraper. The compressed air in the air tank may be supplied by an air compressor (not shown) associated with the earth-moving apparatus 10 or an air supply line (not shown) which may be connected to an external air compressor, such as an air compressor associated with a tractor (not shown).

Figure 2:
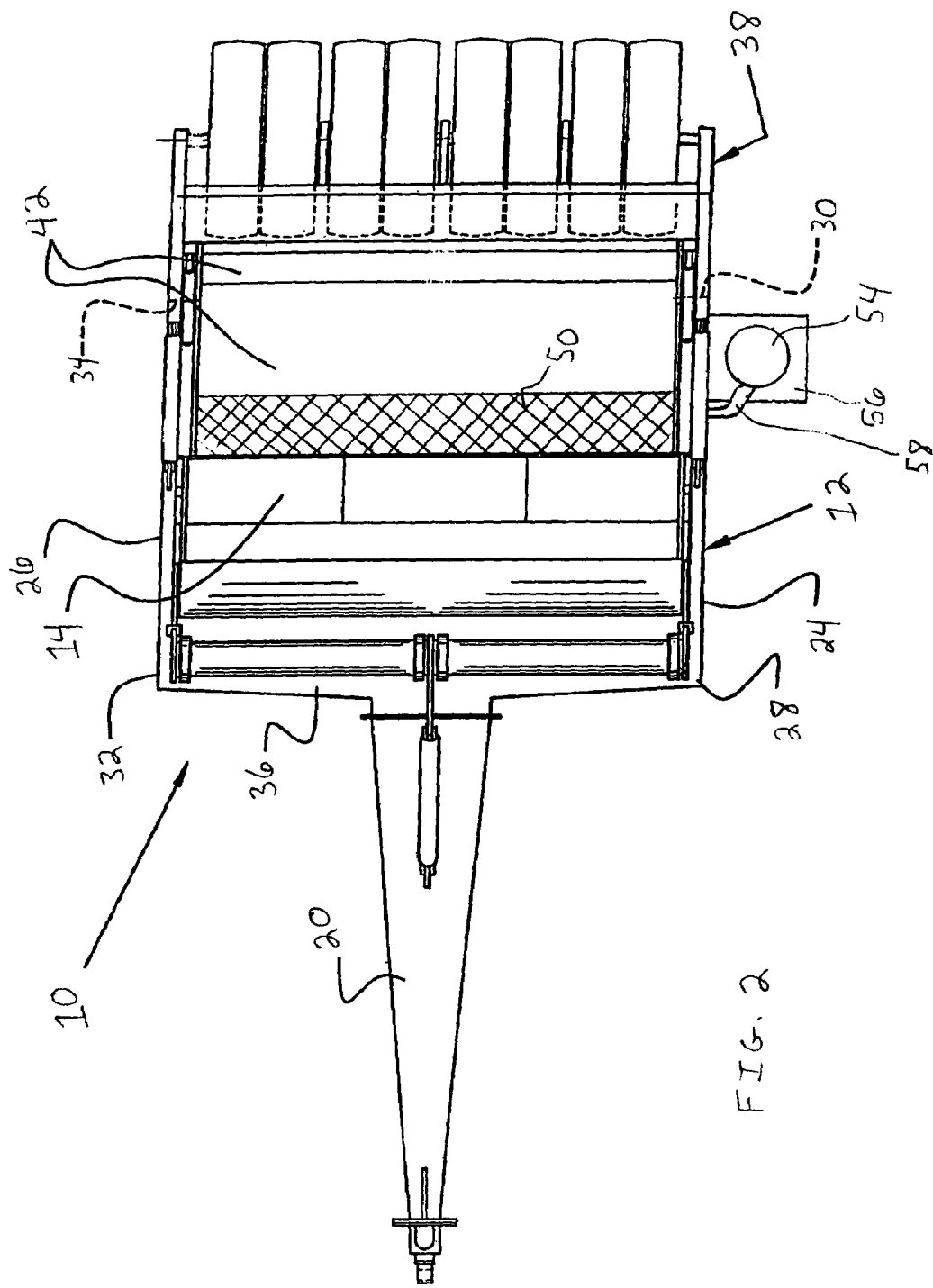
FIG. 2 is a top view of the earth-moving apparatus of FIG. 1.

Referring now to drawing FIG. 2, there is shown a top view of the earth-moving apparatus 10 of FIG. 1. The screen 50 comprises a portion of the floor 42 of the bucket 16 (FIG. 1) proximately located to the cutting blade 14. In another embodiment of the earth-moving apparatus 110, the screen 50 may comprise substantially the entire surface area of the horizontal floor 42 of the bucket 16 as illustrated in drawing FIG. 3. In another embodiment of the earth-moving apparatus 210, a sheet 60 having a plurality of holes 62, forming a lattice, may be used to direct the current of air upwardly away from the floor 42 of the bucket 16 as illustrated in drawing FIG. 4. In addition to covering the portion of the horizontal floor 42 of the bucket 16 proximate the cutting blade 14, the lattice of holes 62 may comprise substantially the entire surface (not shown) of the horizontal floor 42 of the bucket 16.

Figure 4:
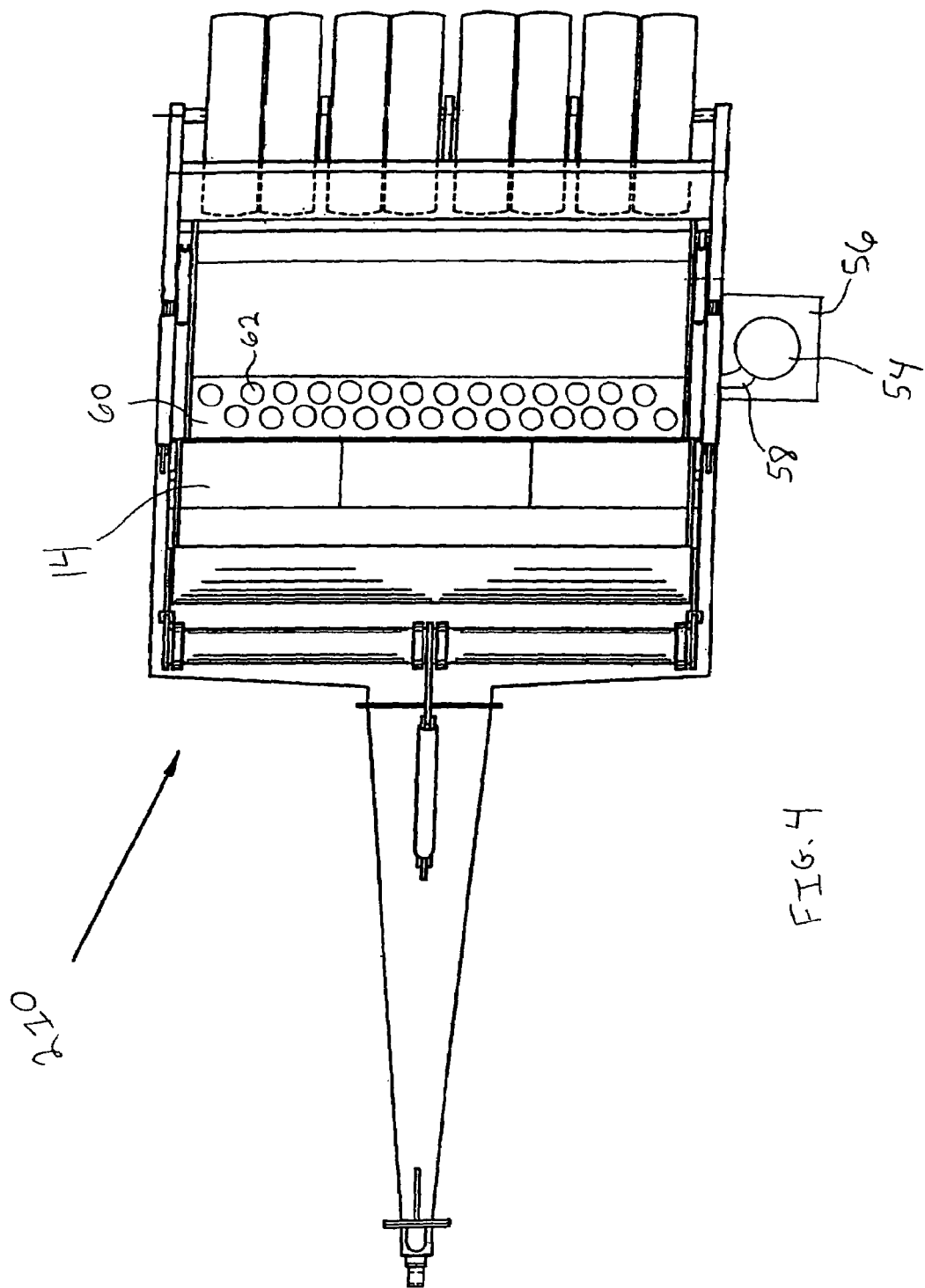
FIG. 4 is a top view of yet another embodiment of an earth-moving apparatus of the present invention.

In the embodiment of FIG. 4, each hole 62 in the floor 42 of the bucket 16 may be fitted with a nozzle (not shown). Each nozzle may be operatively connected to the conduit 58 such that a current of air is delivered to each of the nozzles. In another embodiment, each of the nozzles may communicate with a pipe that is operatively connected to the conduit 58 to deliver the current of air to the nozzles. The nozzles may be retractable nozzles that are flush with, or indented from, the floor 42 of the bucket 16, or form smooth surfaces that soil can flow over, when in a retracted position. The nozzles may then "pop-up" to reveal an air outlet and allow airflow therethrough when in use. Any suitable alternative nozzle for airflow known to those of ordinary skill in the art, such as nonretractable nozzles, may be used and are within the scope of the present invention.

Figure 3:
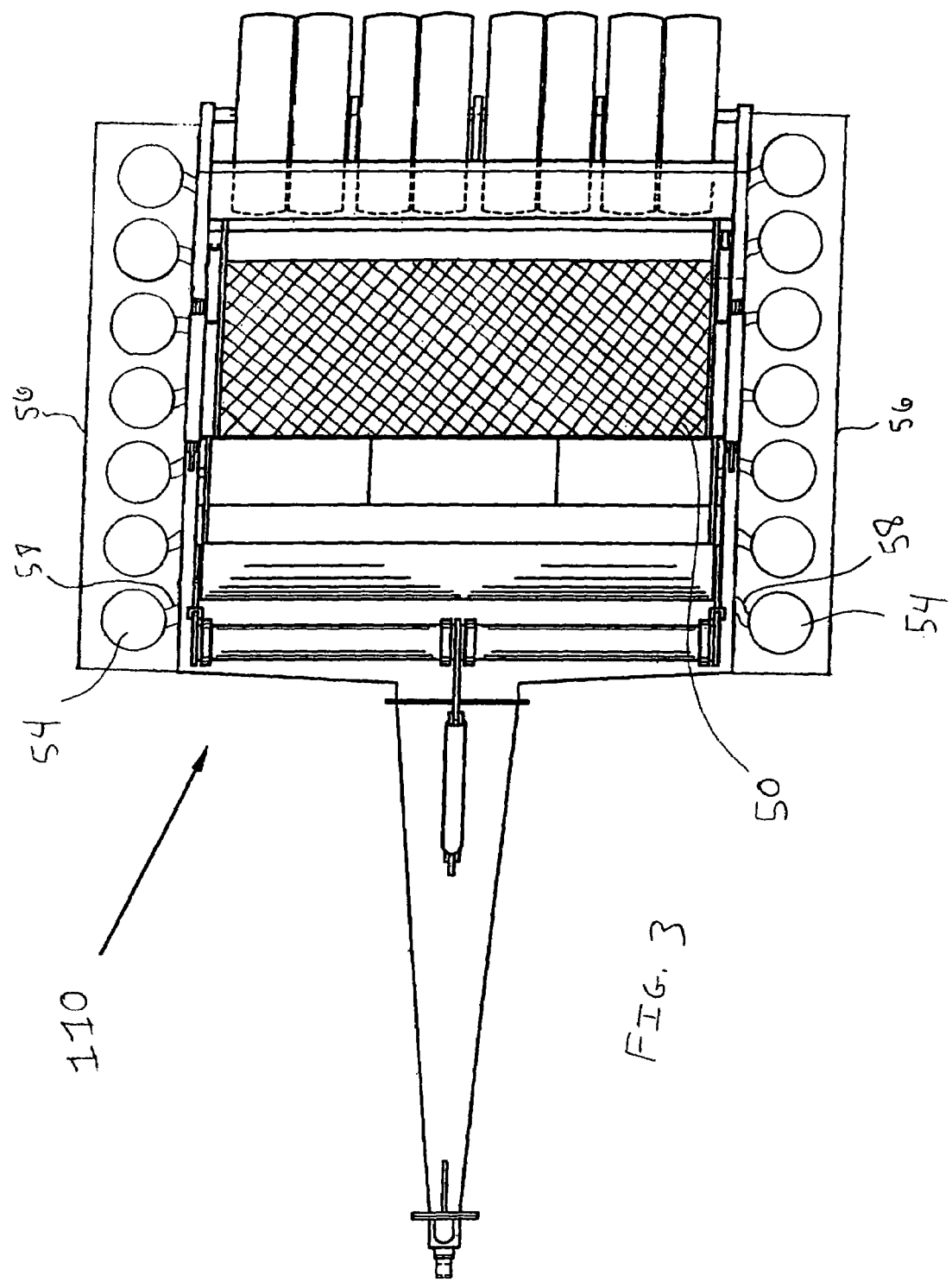
FIG. 3 is a top view of another embodiment of an earth-moving apparatus of the present invention.

Referring again to the earth-moving apparatus 110 of FIG. 3, the air supply system 54 comprises a plurality of air tanks, wherein each air tank is connected to a plurality of corresponding conduits 58. The plurality of air tanks is supported by a pair of shelves 56 attached to the opposing sides of the frame 12 of the earth-moving apparatus 110.

Referring now to drawing FIG. 5, there is shown a side view of the bucket 16 and the cutting blade 14 of the earth-moving apparatus 10 of FIG. 1 including three air tanks as the air supply system 54 with the rest of the components of the earth-moving apparatus 10 omitted. It will be appreciated that any number of air tanks may be used. The conduits 58 extend from the air tanks of the air supply system 54 and are sealably connected to a plenum 64. The plenum 64 includes couplings (not illustrated) for sealably receiving each conduit 58 from the air supply system 54. The plenum 64 directs the current of the air received from the air supply system 54 through the screen 50 upwardly away from the floor 42 of the bucket 16 as illustrated by arrows 66. Also illustrated in drawing FIG. 5 is an air compressor 70 that is sealably connected to the air supply system 54 by air supply lines 72 as known in the art.

Referring to drawing FIG. 6, there is shown the bucket 16 and cutting blade 14 of the earth-moving apparatus 110 of FIG. 4. Each conduit 58 that leads from the air supply system 54 is directed to and sealably attached to each hole 62 of the lattice of holes 62 by a coupling (not shown), or nozzle, as known in the art. The air supply system 54 of drawing FIG. 6 may also include an air compressor (not shown) or be operatively connected to another source of air associated with another device, such as a tractor (not shown).

Referring now to drawing FIG. 7, there is illustrated another embodiment of an air supply system which includes a fan 74, such as a high-speed centrifugal fan. The air current produced by the fan 74 travels through a duct 76 to the plenum 64, where the air current is directed through the screen 50.

The drawings of FIGS. 5–7 are for illustrative purposes only and do not represent the spatial relationship of the elements of the air supply system or the earth-moving apparatus to each other. For instance, various components of the air supply system 54 including the air tanks, the air compressor 70, the conduits 58, the air supply lines 72, the fan 74 and the duct 76 would not extend beyond the bottom of the cutting blade 14 since the bottom of the cutting blade 14 will cut through the earth.

Figure 8:
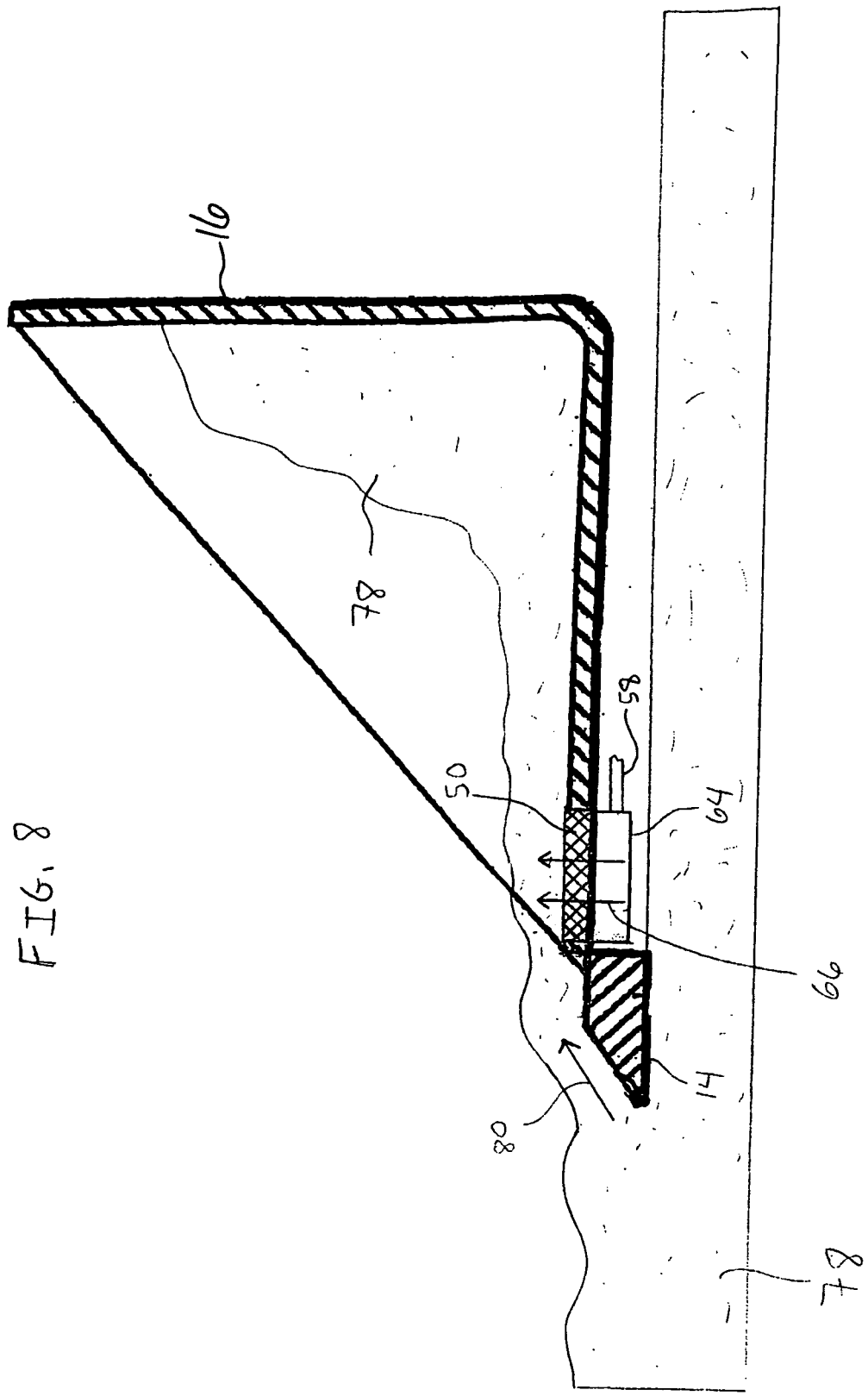
FIG. 8 is a side view of a bucket and air supply system of one embodiment of an earth-moving apparatus moving forward during a scraping process.

Referring now to drawing FIG. 8, there is shown a side view of the bucket 16 of the earth-moving apparatus 10 of FIG. 1 collecting soil 78 in a scraping process. The operation of an earth-moving apparatus or scraper is well known in the art. To cut the soil 78, the earth-moving apparatus 10 is pulled forward by a tractor (not shown) or, if the earth-moving apparatus is self-propelled, it moves forward and the cutting blade 14 is lowered to contact the soil 78. As the earth-moving apparatus 10 moves, the soil 78 cut from the earth travels across the cutting blade 14, as indicated by arrow 79, and is deposited into the bucket 16. The soil 78 also travels over the screen 50 where the current of air is directed towards the soil 78 as illustrated by arrows 66. As illustrated, the current of air is directed towards the soil 78 with the plenum 64, which receives the current of air from the conduit 58. For ease of illustration, the entire air supply system 54 is not illustrated in drawing FIG. 8.

At certain instances during the scraping process, the soil 78 is not able to generate enough force for efficient loading of the soil 78 into the bucket 16. For instance, once a certain amount of soil 78 has been loaded into the bucket 16, loading additional soil 78 into the bucket 16 may become increasingly difficult as more force is required to displace the loaded soil 78. Accordingly, the force of the current of air contacting the soil 78 makes loading of the soil 78 into the bucket 16 more efficient either by loosening the loaded soil 78, by providing a buoyant force below the soil 78 or by reducing the friction between the loaded soil 78 and the bucket 16. In any of these instances, the force required to load additional soil 78 is reduced. Although different soil types may require varying pressures of the current of air to aid in loading, the air supply system 54 of the present invention may desirably be configured to deliver a current of air having a pressure of from about 50 pounds to about 100 pounds psi, and more desirably from about 65 pounds to about 90 pounds psi.

The current of air 66 may be directed towards the soil 78 at any time during the scraping process. For instance, if the fan 74 of FIG. 7 is used as the air supply system 54, the current of air 66 may be continuously directed towards the soil 78 by running the fan 74 during the scraping process. Alternatively, the fan 74 may be activated by an operator of the earth-moving apparatus 10 to run at certain times, such as once a predetermined amount of soil 78 has been loaded in the bucket 16. Although not illustrated, the fan 74 may be configured to be controlled with an electronic switch (not shown) or any other system of allowing the operator to activate the fan 74 during the scraping process as is known in the art.

In other embodiments, the air tanks may be used as the air supply system 54 as illustrated in drawing FIG. 5. In this embodiment, the air tanks each include an amount of compressed air. The air tanks may be configured to release the compressed air continuously during the scraping process, to intermittently release bursts of air during the scraping process or to release the compressed air at the direction of the operator of the earth-moving apparatus 10. For instance, the air tanks may be configured to intermittently release air in bursts or pulses from the air tanks sequentially wherein a first air tank releases a first burst of air and then a second air tank releases a second burst of air and so on through the plurality of air tanks. When subsequent air tanks release air, the air tanks that discharged air may be refilled using the air compressor 70 as depicted in drawing FIG. 5. Alternatively, each of the air tanks may be configured to release the compressed air simultaneously or at the direction of the operator of the earth-moving apparatus 10. It will be appreciated that in embodiments using a single air tank, control valves in the air supply system 54 may be used to provide pulsing air bursts. For example, a bank of control valves may be fired in sequence to provide pulsing at individual air outlets, such as individual nozzles or screens, or to all air outlets at once.

It will be apparent to those of ordinary skill in the art that the present invention also has utility in making the soil 78 easier to unload from the bucket 16. Since the currents of air 66 loosen the soil 78 during loading, the loosened soil 78 will also be easier to unload from the bucket 16 at the discretion of the operator.

Referring now to drawing FIG. 9, there is shown another embodiment of the air supply system of the present invention. As illustrated, a portion of the floor 42 of the bucket 16 comprises the screen 50. A pair of air jets 80 is operatively connected to conduits (not shown) that provide a current of air. Although two air jets 80 are illustrated, it will be apparent to those of ordinary skill in the art that any number of air jets 80 may be included such that the current of air is delivered to the soil across the entire width of the bucket 16. A set of air deflection plates 82 is also illustrated. The air deflection plates 82 are set at an angle such that the current of air, illustrated with horizontal arrows 84, flowing from the air jets 80 contacts the air deflection plates 82, is directed upwards as illustrated by vertical arrows 86, and passes through the screen 50. By positioning the air jets 80 to shoot the air current horizontally, there is a smaller likelihood that the openings (not illustrated) of the air jets 80 will become clogged with soil.

Also illustrated in drawing FIG. 9 is a skid plate 88 which functions to prevent the air jets 80 and air deflection plates 82 from contacting and possibly being damaged by the earth or rocks. A space exists between the lowermost portion of the air deflection plates 82 and the uppermost portion of the skid plate 88. The space allows any soil or soil particles that fall through the screen 50 to land on the skid plate and exit over the end of the skid plate 88 opposite the cutting blade 14. Although not illustrated in previous drawing figures, it will apparent to those of ordinary skill in the art that the skid plate 88 may be used in conjunction with the other embodiments of the present invention previously described.

Another embodiment of the air supply system of the present invention is illustrated in drawing FIG. 10. A portion of the floor of the bucket 16 comprises a plurality of slats 90. As illustrated, the slats 90 are angled in a direction such that soil (not shown) entering the bucket 16 will be less likely to clog or cake in the spaces between the slats 90. The slats 90 may be supported at either end by support members or include a plurality of support members (not illustrated) that support the slats 90 across the width of the bucket 90. The current of air flows upwardly through the slats 90 from the plenum 64, which is operatively connected to the conduit 58 that receives the current of air from the air supply system (not illustrated). On the lower portion of the plenum 64 is a hinged door 92 that may be opened to remove any soil or soil particles that fall through the slats 90. A skid plate 88 is also present for protecting the plenum 64 and conduit 58.

Figure 11:
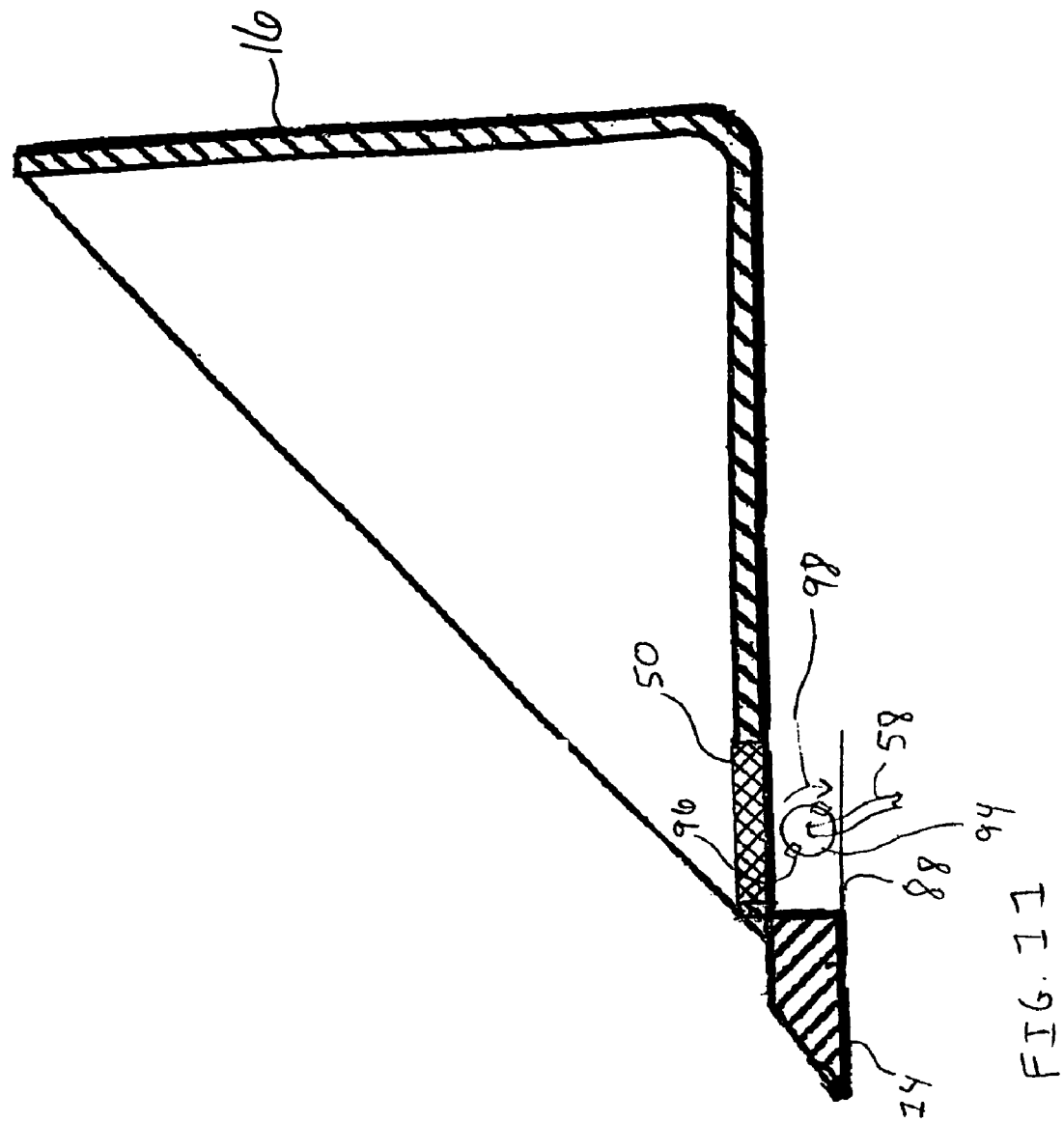
FIG. 11 is a side view of a bucket and air supply system of an additional embodiment of an earth-moving apparatus of the present invention.

Referring now to drawing FIG. 11, there is illustrated yet another embodiment of the air supply system of the present invention. A rotatable cylinder 94 is shown operatively connected to the conduit 58 at a proximate end thereof. The rotatable cylinder 94 includes a substantially hollow core through the center thereof wherein the hollow core communicates with the conduit 58 for allowing the current of air to pass through the rotatable cylinder 94. The rotatable cylinder 94 also includes a plurality of holes 96 for allowing the current of air to travel out of the rotatable cylinder 94. As illustrated, the plurality of holes 96 are located opposite one another, but it will be apparent to those of ordinary skill in the art that any number and distribution of holes 96 in the rotatable cylinder 94 is within the scope of the present invention. Further, in addition to using holes 96, any other orifice or configurations thereof that allow the current of air to leave the rotatable cylinder 94 are within the scope of the present invention. The rotatable cylinder 94 may rotate in the direction indicated by arrow 98 such that when the illustrated airflow system is in operation during the scraping process, the holes 96 are rotating and less prone to becoming clogged or caked with soil or soil particles. It will be appreciated that rotatable cylinder 94 may be rotated in either direction, or may oscillate to achieve this effect. A skid plate 88 is also illustrated for protecting the components of the airflow system.

It will be appreciated by those of ordinary skill in the art that the embodiments described herein are not intended to limit the scope of the present invention. Various combinations and modifications of the embodiments described herein may be made without departing from the scope of the present invention and all modifications are meant to be included within the scope of the present invention.

Thus, while certain illustrative embodiments and details have been described for purposes of illustration of the invention, it will be apparent to those of ordinary skill in the art that various changes in the invention described herein may be made without departing from the scope of the present invention, which is defined in the appended claims.

What is claimed is:

1. A device for air-assisted loading of soil in an earth-moving or ground-leveling apparatus comprising:
    a bucket for an earth-moving or ground-leveling apparatus, the bucket comprising a space for containing soil moved by the earth-moving or ground-leveling apparatus, the space for containing soil being defined by a floor and at least one sidewall;
    at least one source of a current of air; and
    at least one conduit sealably connected to the at least one source of the current of air for directing the current of air to soil moved by the earth-moving or ground-leveling apparatus; wherein the at least one conduit is operatively connected to the floor of the bucket such that the at least one current of air flows upwards through the floor of the bucket to contact the soil moved by the earth-moving or ground-leveling apparatus and disposed within the space for containing soil.

2. The device of claim 1, further comprising a plenum for transferring the current of air from the at least one conduit to the soil moved by the earth-moving or ground-leveling apparatus.

3. The device of claim 2, wherein the plenum is configured to direct the current of air through at least one hole in the floor of the bucket.

4. The device of claim 1, wherein the at least one source of the current of air comprises an air tank.

5. The device of claim 4, further comprising an air compressor.

6. The device of claim 1, wherein the at least one source of the current of air comprises a fan.

* * * * *